April 20, 1948. H. E. HALL 2,440,010
HOIST ATTACHMENT FOR TRACTORS
Filed Oct. 4, 1946 3 Sheets-Sheet 2

Inventor
Howard E. Hall

By Cushman, Darby & Cushman
Attorneys

April 20, 1948.     H. E. HALL     2,440,010
HOIST ATTACHMENT FOR TRACTORS
Filed Oct. 4, 1946     3 Sheets-Sheet 3
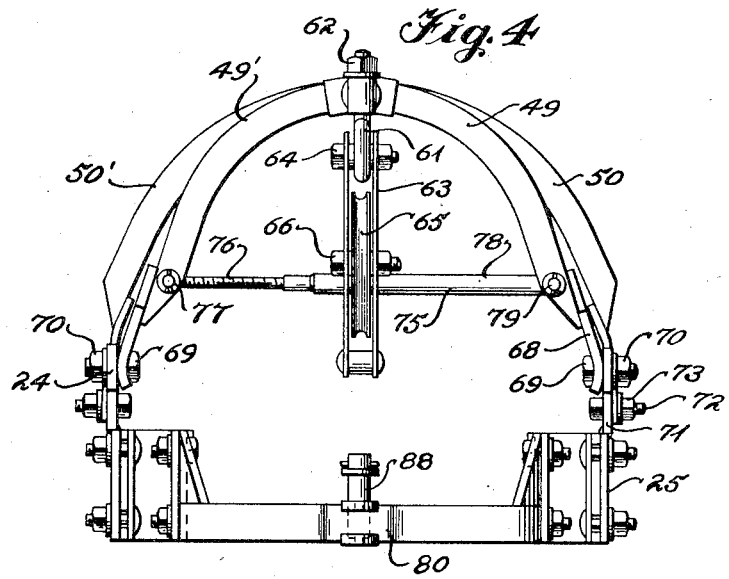
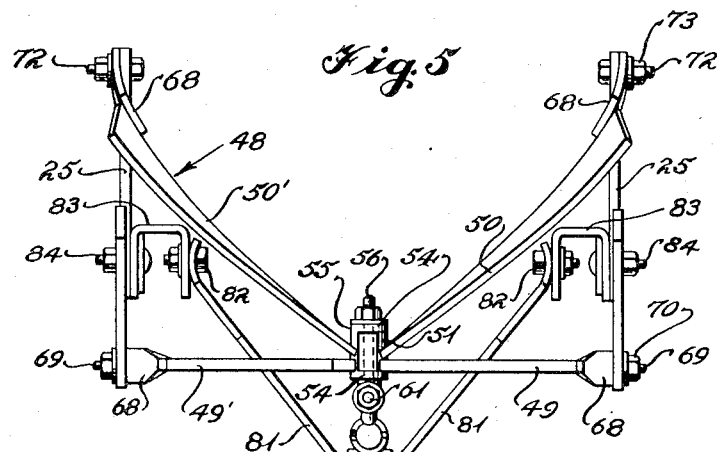
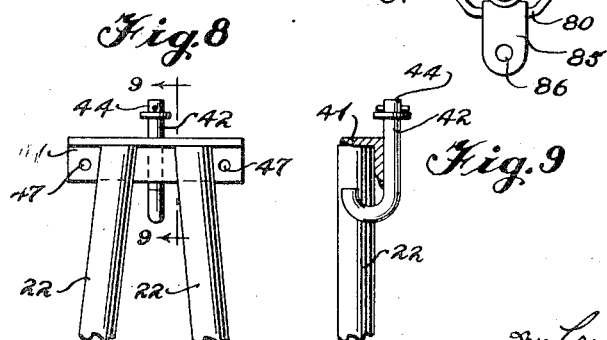
Inventor
Howard E. Hall
Attorneys Patented Apr. 20, 1948

2,440,010

UNITED STATES PATENT OFFICE 2,440,010

HOIST ATTACHMENT FOR TRACTORS

Howard E. Hall, Boise, Idaho, assignor to Olson Manufacturing Company, Boise, Idaho, a corporation of Idaho Application October 4, 1946, Serial No. 701,342

5 Claims. (Cl. 214—140)

The present invention relates to an improved hoist unit attachment for tractors and the like, and more particularly, to a dual frame construction connected to the tractor and provided with means for interchangeably or selectively connecting the hoist drum to different types of loading or material handling and transporting machines.

Heretofore, it has been customary to provide material handling machines with a scoop or shovel arranged to be operated by the machine. It has also been customary to associate with a tractor, a hay sweep or the like for picking up or transporting the load from one point to another. However, such constructions have not previously been combined in a unitary assembly and mounted on a tractor in such a manner that a single hoist drum carried by the tractor may be used for raising, lowering, and transporting work requiring either high displacement or low vertical movement. Accordingly, an important feature of the present invention consists in mounting on a tractor, a mechanical cable hoist mechanism including a hoist drum which is operatively connected to the tractor, and associating with the hoist drum, a high supporting frame and a low supporting frame. Each of the supporting frames is provided with means for detachably receiving the outer end of a wire cable, associated with the hoist drum, so that the drum may be selectively or interchangeably connected to work requiring either high elevational displacement or for handling material having a low hoist or vertical movement.

A further object consisting in associating with a tractor or the like, an adjustable pulley supporting frame having a pair of front arms and a pair of complementary rear arms which extend transversely and upwardly from the tractor. The front and rear arms on one side of the tractor are integrally connected at their upper ends to a transversely disposed, tubular bearing member, while the front and rear arms on the other side of the tractor are connected to a substantially U-shaped bearing member, the arms of which have openings which register with the tubular member and are hinged thereto by a pivot pin or bolt, so that the arms on one side of the tractor are movable independently of the arms on the other side thereof. Adjustable means are provided for moving and maintaining the arms so that the frame may be connected to tractors of different width.

Other objects and advantages of the invention will become apparent with the following description when taken in conjunction with the following claims and drawings.

Referring to the drawings which show several preferred embodiments the invention may assume:

Figure 2 is a detail side view of another form of tractor having associated therewith the low supporting frame and showing the parts operatively connected to a hay sweep or the like.

Figure 4 is a front view of Figure 3.

Figure 5 is a plan view of Figure 4.

Figure 8 is a detail sectional view of the upper end of the high frame, and

Figure 9 is a sectional view taken substantially along the line 9—9 of Figure 8.

Figure 1:
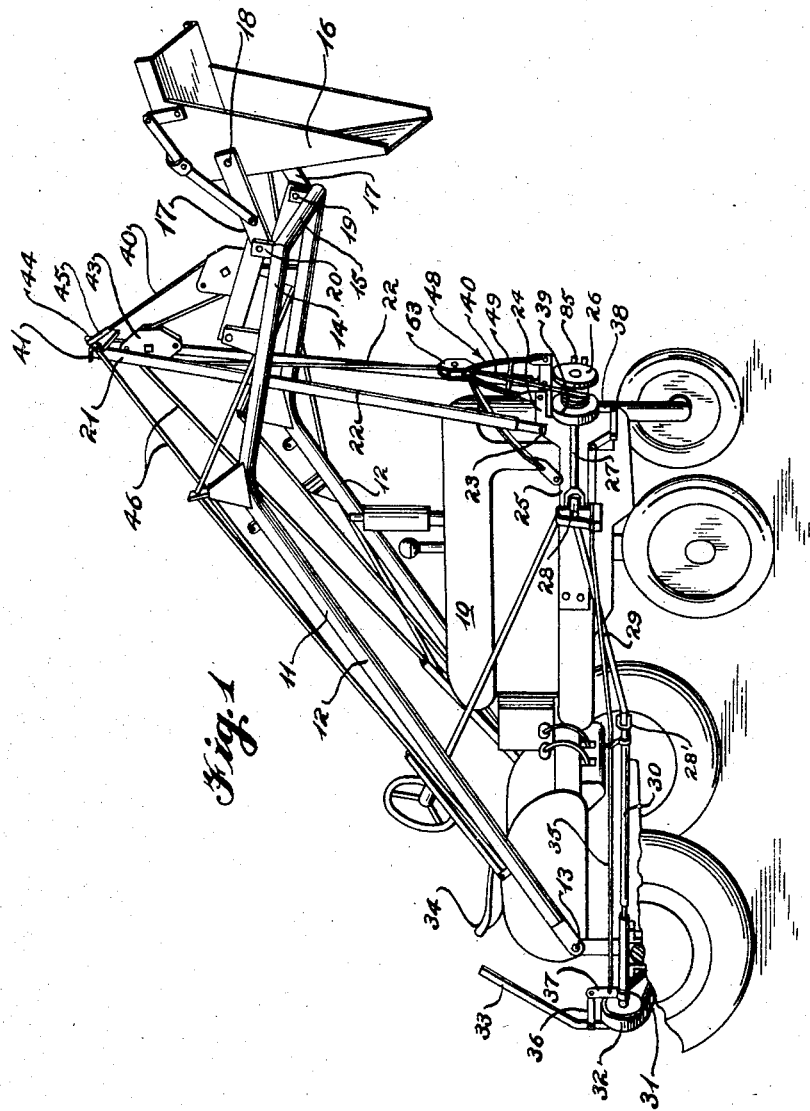
Figure 1 is a perspective view of one type of tractor provided with the high and low supporting frames constructed in accordance with the invention.

Referring to the drawings and, more particularly, Figure 1, 10 designates a well-known type of tractor to which is connected a vertical swinging frame 11 provided with inclined spaced side arms 12 connected at their lower ends as at 13 to the sides of the tractor. The arms 12 terminate at their upper ends in horizontal forwardly extending portions 14 connected by a transverse portion 15. An operable member such as the scoop or bucket 16 has spaced depending arms 17 that are secured at their upper ends as at 18 to the side walls of the scoop and are pivoted as at 19 to lugs 20 on the horizontal portions 14. Assuming that the material to be loaded, transported and discharged by the bucket 16 is of such a nature as to require a high elevational movement to dump the same from the bucket, the vertical swinging frame 11 will have associated with it a relatively high A-shaped frame 21 having diverging arms 22 connected at their lower ends as at 23 to the forwardly extending arms 24 of the side plates 25 located on opposite sides of the tractor adjacent the front end thereof. The arms 22 are sufficiently flexible that their lower ends may be moved or spaced to be connected to tractors of different width.

A hoist drum 26 is positioned to one side and in front of the tractor 10, and is arranged to be driven by the power take-off shaft of the tractor through a drive shaft 27 having an universal connection as at 28 with an intermediate shaft 29 that is connected to a shaft 30 by a universal coupling 28'. The shaft 30 is driven from the power take-off shaft of the tractor through a roller chain 31 and a clutch assembly 32 which is operated by a handle 33 conveniently positioned close to the driver's seat 34 at the rear of the tractor. The operating handle 33 is also connected to one end of a brake rod 35 through the link 36 and arm 37. The opposite or forward end of the brake rod 35 is connected through a link 38 to a suitable brake mechanism 39 associated with the drum 26, so that the clutch and brake mechanisms are operated simultaneously by the lever 33. As shown in Figure 1, the lever 33 is in its neutral position and it will be seen that upon moving this lever in one direction, the clutch operatively connects the drive shaft 37 and drum 26 to the tractor and, at the same time, releases the brake on the drum. Conversely, when the operating lever 33 is moved from its neutral position in an opposite direction, it will apply the brake to the drum 26 and release the clutch so as to disconnect the drum from the tractor. A flexible wire cable 40 is secured at one end to the drum 26 so as to be wound thereon, and is of such length as to be able to operatively connect the drum 26 to work or loaders requiring high elevations, or to raising, transporting and dumping work having a low hoist, such as hay sweeps, dozers and the like.

The arms 22 of the high A-frame are connected together at their upper ends by a cross tie bar 41 that may be L-shaped in cross section (Fig. 9). Extending downwardly and inwardly between the arms 22 and welded to the tie bar 41 is a pulley sheave hook 42, to which is detachably connected the upper pulley block 43 (Fig. 1). The upper portion 44 of the hook 42 constitutes retaining means for receiving the looped outer end 45 of the cable 40 when the drum is associated with the high frame to actuate the bucket 16. Brace rods 46 may extend upwardly from the sides of the tractor and be connected at their upper ends to the tie bar 41 through the openings 47 (Fig. 8).

Figures 6, 7:
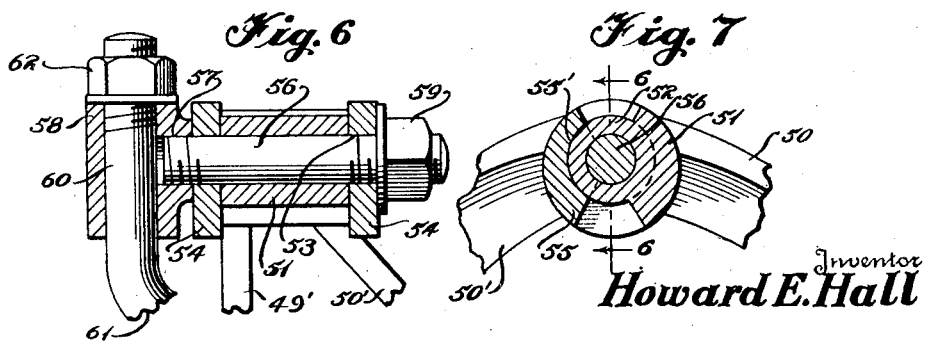
Figure 6 is a detailed sectional view taken substantially along the line 6—6 of Figure 7.
Figure 7 is a sectional view taken substantially along the line 7—7 of Figure 3.

Also mounted on the tractor at the front thereof, and adjacent the high frame 21 is an adjustable low A-frame generally designated in Figure 1 as 48. The low frame 48 preferably comprises a front pair of curved short arms 49 and 49' and a complementary pair of long curved arms 50 and 50'. The front arm 49 and its adjacent rear arm 50 are preferably formed integral with a segmental member 51 having a tubular central portion 52 (Fig. 7) that transversely aligns with openings 53 (Fig. 6) in the spaced arms 54 of a substantially U-shaped member 55 (Fig. 5), so as to receive a threaded bolt or pin 56 that has its inner end suitably secured as at 57 to a tubular body member 58 and its outer end arranged to receive a nut 59 for detachably maintaining the arms in position. The segmental member 51 fits between the arms 54 of the U-shaped member 55 and the inner wall of the member 55 is curved as at 55' (Fig. 7) so as to conform with the curvature of the adjacent tubular portion 52. The inner face or side of the segmental member 51 is circumferentially spaced from the adjacent inner side of the member 55 so that these parts may freely swing about the bolt 56 (Fig. 7). It will be noted that the short arm 49 and long arm 50 on the segmental portion 51 may be swung laterally on the bolt 56 independently of the short arm 49' and the long arm 50' integral with the U-shaped member 55, so as to vary the width between these arms and, thus adapt the small frame to be readily connected to tractors of different widths at a minimum expenditure of time and effort. The tubular body 58 constitutes a bearing for the upper end of the shank 60 of an eye bolt 61, and the shank 60 is externally threaded to receive a clamping nut 62. The swivel eye bolt 61 is connected to a block 63 (Fig. 4) by bolt 64 and a pulley 65 journalled at 66 within the block 63, is arranged to receive the intermediate portion of the flexible cable 40 in order to pass the same either upwardly, over and through the block 43 for the purpose of attaching the drum to an operable member requiring high elevational movement, or outwardly and forwardly to a low hoist operating instrumentality, such as a hay sweep, dozer or the like 67, as disclosed in Figure 2 and in a manner as will be subsequently described.

Figure 3:
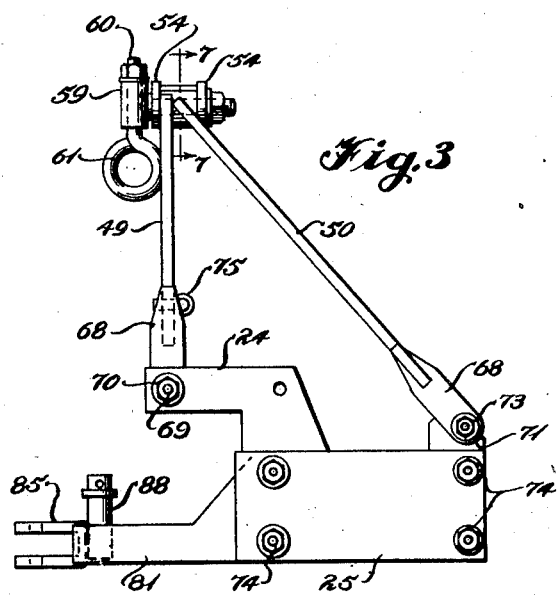
Figure 3 is a detail side view of the low supporting frame and its associated parts.

The lower ends of the front short arms 49 and 49', as well as the ends of the long arms 50 and 50', may be connected to flexible straps 68, and the front pair of these straps are provided with openings which register with complementary formed openings in the arms 24 (Fig. 3) of the plates 25 and are detachably secured in position by the threaded bolts 69 and the nuts 70. Similarly, the straps 68 on the rear arms 50 and 50' are connected to lugs 71 on the plates 25 by the bolts 72 and nuts 73 (Fig. 4). The plates 25 are secured by the retaining bolts 74 to opposite sides of the tractor adjacent the forward end thereof. The front arms 49 and 49' may be moved towards or away from each other and may be maintained in a predetermined position by an adjustable tie bar 75 (Fig. 4) which includes a threaded rod 76 connected as at 77 to the lower end of the arm 49' and extends within a tubular member 78 having an internally threaded wall for receiving the complementary threads on the rod 76, the outer end of this member 78 is pivoted as at 79 to the arm 49. Thus, it will be seen that the side plates 25 and their arms 24 are associated with the arms of the high frame 21 and the low frame 48, so that these frames may be readily connected to different types and widths of tractors.

In order to detachably connect the low A-frame 48 to work or a load requiring a low hoist, a hitch bar 80, preferably having rearwardly diverging yieldable arms 81, is connected at its ends as at 82 to U-shaped bars 83 (Fig. 5) which, in turn, are secured as at 84 to the plates 25. The hitch bar 81 is formed centrally with a forwardly extending yoke 85, the spaced arms of which are provided with vertically aligned openings 86 to receive a pin 95 for detachably connecting a hay sweep, dozer or the like to the tractor. The arms 82 are sufficiently yieldable to spread or contract the same in order to be readily connected to tractors of different widths.

Figure 2:
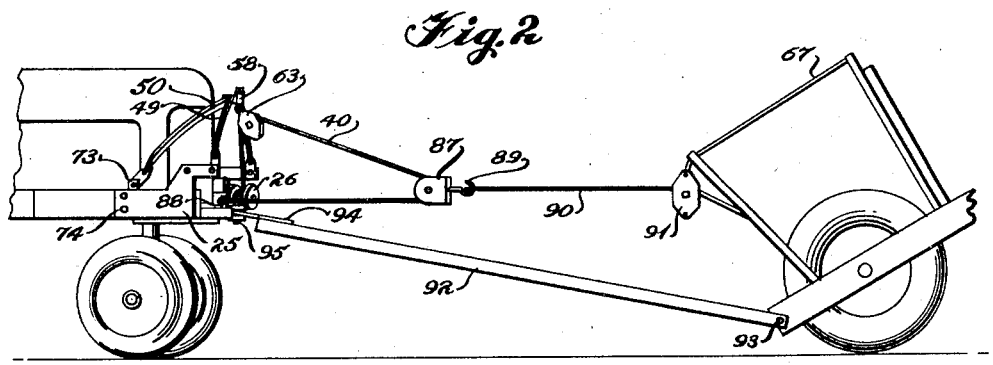

In Figure 2, the low adjustable frame is shown associated with a tractor of a different type than that disclosed in Figure 1 and, for the purpose of illustration, the high frame and its associated parts have been omitted. It will be noted that the hoist drum 26 and its drive shaft are positioned on the side opposite the tractor shown in Figure 1. The small A-frame is otherwise substantially similar in construction and operation to the small frame shown in Figure 1. In order that the intermediate portion of the wire cable 40, as it leaves the drum 26, may be operatively connected to a low hoist mechanism, such as the hay sweep 67, the cable after passing over the pulley 63, instead of being carried upwardly, as shown in Figure 1, is passed outwardly and forwardly through a loose pulley block 87 and returned to the tractor, so as to be detachably secured to an anchor pin 88. The pulley block 87 is provided with a hook 89 for receiving a flexible cable 90 that is connected by a pulley 91 to an operable member carried by the sweep 67. A hitch bar 92 is connected at one end as at 93 to the sweep 67 and may be provided at its opposite end with a strap 94 having an opening therein, so that when the strap is inserted between the yoke 85 this opening will register with the opening 86 and will be connected to the tractor by the pin 95.

It will be seen that the high and low supporting frames may both be connected to a tractor or the like by the side plates 25, or either one of the supporting frames alone may be attached to the tractor by the plates 25. In other words, simple, efficient and economical means are provided, whereby the hoist drum 26, which operates the wire cable 24, may selectively or interchangeably be connected to different types of operable members at a minimum expenditure of time and effort.

Due to the fact that both the high frame and low frame are laterally adjustable, it will be seen that this dual frame structure can be readily connected to different types of material handling machines of varying widths and sizes, so that a tractor with the attachment installed thereon may be used as a mechanical hoist for loading, transporting and dumping different kinds of materials without any substantial loss in time for changing the tractor over for use with the particular work to be handled. It will be observed that the pulley 63 on the low frame constitutes a common means for operatively connecting the free end of the cable 40 to either the high frame and its associated parts for high elevational movement, as shown in Figure 1, or to a low hoist instrumentality, such as shown in Figure 2.

It will be understood that the forms of the invention are merely illustrative of preferred embodiments and that such changes may be made as fall within the purview of one skilled in the art without departing from the spirit of the invention and the scope of the following claims.

I claim:

1. In a combination with a tractor, a hoist mechanism including a shaft extending along one side of the tractor, means operatively connecting said shaft to the power shaft of the tractor, a hoist drum fixed to the forward end of said shaft, a high supporting frame extending transversely of the tractor adjacent said drum, and having a pair of downwardly diverging arms, a low supporting frame extending transversely of the tractor adjacent said high supporting frame, said low supporting frame having a pair of front arms and a pair of rear arms, plates secured to opposite sides of the tractor, means connecting the lower ends of the arms of the high supporting frame and the low supporting frame to said plates, each of said supporting frames having a pulley pivotally connected thereto, the pulley on the low supporting frame being positioned below the pulley on the high supporting frame, a flexible cable connected at one end to said hoist drum, means for detachably connecting the outer end of the cable to each of the supporting frames, an operable member associated with the high supporting frame, a second operable member associated with the low supporting frame, said cable arranged to be interchangeably connected through the pulleys to said operable members to connect the hoist drum to work requiring either a high or a low operating hoist.

2. In combination with a tractor, a hoist mechanism including a shaft extending along one side of the tractor, means operatively connecting said shaft to the power shaft of the tractor, a hoist drum fixed to the forward end of said shaft, a high supporting frame extending transversely of the tractor adjacent said drum and having a pair of downwardly diverging arms, a low supporting frame extending transversely of the tractor adjacent said high supporting frame, said low supporting frame having a pair of front arms and a pair of rear arms, plates secured to opposite sides of the tractor, means connecting the lower ends of the arms of the high supporting frame and the low supporting frame to said plates, means pivotally connecting the front and rear arms of the low supporting frame on one side of the tractor to the front and rear arms on the other side of the tractor, means for adjusting the width of the short and long arms of the low supporting frame so that the latter may be connected to tractors of different width, each of said supporting frames having a pulley pivotally connected thereto, the pulley on the low supporting frame being positioned below the pulley on the high supporting frame, a flexible cable connected at one end to said hoist drum, means for detachably connecting the outer end of the cable to each of the supporting frames, an operable member associated with the high supporting frame, and a second operable member associated with the low supporting frame, said cable arranged to be interchangeably connected through the pulleys to said operable members to connect the hoist drum to work requiring either a high or a low operating hoist.

3. In combination with a tractor, a hoist mechanism including a drive shaft, a hoist drum fixed to said shaft, a supporting frame including a pair of transversely disposed front arms and a pair of transversely disposed rear arms extending upwardly and inwardly from opposite sides of the tractor, the front arm and rear arm on one side of the tractor being connected at their upper ends to a tubular member, the front and rear arms on the opposite sides of the tractor being connected to a substantially U-shaped member, the spaced arms of said U-shaped member having aligned openings and overlapping the ends of the tubular member, a body member having a vertical opening and a retaining bolt extending laterally therefrom, said retaining bolt extending through said openings and the tubular member so that the front and rear arms on one side of the tractor may swing laterally relative to the front and rear arms on the opposite sides thereof, a depending eye bolt connected to said retaining pin, and an adjustable tie bar connected to the lower ends of said front arms for moving and maintaining the same to vary the width between the arms, a pulley connected to said eye bolt, a hitch bar extending transversely and forwardly of the tractor, an operable member, means connecting the operable member to the hitch bar, and a cable connected at one end to said hoist drum, means detachably connecting the outer end of the cable to the tractor, a loose pulley for receiving an intermediate portion of the cable, and means connecting the loose pulley to the operable member.

4. In combination with a tractor, a hoist mechanism including a shaft extending along one side of the tractor, means for operatively connecting said shaft to the power shaft of the tractor, a hoist drum fixed to the forward end of the shaft, a supporting frame extending transversely of the tractor adjacent said drum, said supporting frame including a pair of forward arms and a pair of rear arms extended upwardly from opposite sides of the tractor, means pivotally connecting the front and rear arms on one side of the tractor to the front and rear arms on the opposite sides thereof, an adjustable tie bar connected to said front pair of arms for moving and maintaining the latter in a fixed position relative to each other, a pair of plate members secured to opposite sides of the tractor, means connecting the lower ends of said arms to said plate members, a hitch bar extending forwardly from said plate members, an operable member, means connecting the operable member to the hitch bar, a pulley connected to the supporting frame, a cable connected at its inner end of said drum, means for detachably connecting the outer end of said cable to the hitch bar, and a loose pulley connected to the operable member and arranged to receive an intermediate portion of said cable for operatively connecting the operable member to the drum.

5. In combination with a tractor, a hoist mechanism mounted on the tractor and including a hoist operated by the tractor, a high supporting A-frame extending transversely and upwardly from the forward end of the tractor and connected to the opposite sides thereof, a pulley connected to the upper end of the A-frame, an operable member associated with the A-frame, a low supporting frame adjacent the high supporting frame, said low frame including a pair of transversely disposed front arms and a pair of transversely disposed rear arms extending upwardly and inwardly from opposite sides of the tractor, means pivotally connecting the front and rear arms on one side of the tractor to the front and rear arms on the opposite sides thereof, an adjustable tie bar connected to said front pair of arms for moving and maintaining the latter in a fixed position relative to each other, a hitch bar extending forwardly from said tractor, a second operable member, means connecting the second operable member to the hitch bar, a pulley connected to the low supporting frame, a cable connected at its inner end to said drum, and means for detachably connecting the outer end of said cable to the tractor, the parts being constructed and arranged so that the cable may be selectively connected to either of the operable members to actuate the same.

HOWARD E. HALL.

REFERENCES CITED

The following references are of record in the file of this patent:

UNITED STATES PATENTS

| Number | Name | Date |
| --- | --- | --- |
| 745,137 | Beard | Nov. 24, 1903 |
| 1,215,874 | Scherrer | Feb. 13, 1917 |
| 1,341,176 | Jones et al. | May 25, 1920 |
| 1,636,136 | Kernes | July 19, 1927 |
| 1,658,873 | Younkman et al. | Feb. 14, 1928 |
| 1,690,372 | Livesay | Nov. 6, 1928 |
| 1,805,402 | Johnson | May 12, 1931 |

FOREIGN PATENTS

| Number | Country | Date |
| --- | --- | --- |
| 539,767 | Great Britain | Sept. 23, 1941 |